(12) United States Patent
Bruland

(10) Patent No.: US 6,508,594 B1
(45) Date of Patent: Jan. 21, 2003

(54) OPTICAL PLUG CONNECTOR

(75) Inventor: Alexander Bruland, Rahden (DE)

(73) Assignee: Harting Automotive GmbH & Co. KG (DE)

( * ) Notice: Subject to any disclaimer, the term of this patent is extended or adjusted under 35 U.S.C. 154(b) by 32 days.

(21) Appl. No.: 09/689,233

(22) Filed: Oct. 11, 2000

(30) Foreign Application Priority Data

Oct. 25, 1999 (DE) .......................................... 199 51 032

(51) Int. Cl.[7] .................................................. G02B 6/36
(52) U.S. Cl. .............................. 385/77; 385/53; 385/60; 385/76; 385/78; 385/59; 385/139
(58) Field of Search .......................... 385/77, 60, 62, 385/66, 78, 81, 86, 87, 53, 59, 76, 139

(56) References Cited

U.S. PATENT DOCUMENTS

| 4,162,816 A | 7/1979 | Malsot .......................... 339/64 |
| 5,329,603 A | * 7/1994 | Watanabe et al. .............. 385/86 |
| 5,611,012 A | * 3/1997 | Kuchenbecker ............... 385/86 |
| 5,883,995 A | 3/1999 | Lu ................................ 385/60 |
| 6,146,023 A | * 11/2000 | Weigel ........................ 385/139 |

FOREIGN PATENT DOCUMENTS

| DE | 297 09 602 U1 | 9/1997 | .................. 385/77 |
| EP | 0 114 230 B1 | 11/1986 | |
| JP | 59147308 | 8/1984 | |

* cited by examiner

Primary Examiner—Brian Healy
(74) Attorney, Agent, or Firm—Cook, Alex, McFarron, Manzo, Cummings & Mehler, Ltd.

(57) ABSTRACT

For optical waveguides which may be laid with some freedom, for the transmission of optical signals, a detachable optical plug connector constructed to be of dual gender (comprising two identical plug housings) is proposed, whereof ends of the optical waveguides fixed in fiber end sleeves are held by pressure springs at a constant minimum clearance, with possible axial displacements of the optical waveguides being compensated by correspondingly constructed channels within the plug housing.

2 Claims, 3 Drawing Sheets

OPTICAL PLUG CONNECTOR

The invention relates to an optical plug connector for optical waveguides having a plug housing, the plug housing having an insertion side for optical waveguides and a plug side, and ends of the optical waveguides provided with fiber end sleeves pointing towards the plug side.

Optical plug connectors are required in communications technology for the mechanical and optical connection of optical waveguides for the transmission of analog and/or digital signals at high data transmission speeds in a manner insusceptible to faults.

It is known to connect optical waveguides to be laid with some freedom and having a connector and a counter-connector or a complex combination of connector/coupling/connector to one another. U.S. Pat. No. 5,883,995 discloses an optical waveguide plug connection, and describes resiliently mounted optical waveguides having a closure cap and arranged in a manner latchable into a coupling.

The object of this invention is to construct an optical coupling of the type mentioned at the outset such that optical waveguide connections laid with some freedom and having small mechanical dimensions have optimum coupling properties even in harsh environmental conditions and can be plugged in just as simply as electrical plug connectors.

This object is achieved in that the optical waveguides are held in the region of the insertion side by means of tension relief elements, in that the optical waveguides are laid with their fiber end sleeves in channels made in the plug housing, in that the fiber end sleeves are arranged next to one another, offset in the direction of plugging in, in that at least one of the fiber end sleeves is provided with a pressure spring, the fiber end sleeve being held axially resiliently, in that at least that channel in which the optical waveguide whereof the fiber end sleeve is provided with the pressure spring is laid has a widened portion, and in that the front end of the fiber end sleeve lying recessed in the direction of plugging in penetrates into a guide bore and is held therein.

The advantages achieved by the invention consist in particular in the fact that by constructing the optical plug connector as a dual-gender plug connector in which the connector and the counter-connector are of identical construction, simple handling, low-cost production and simplified logistics are made possible.

By using fiber end sleeves, known accordingly from DE 297 09 602 U1, for optical waveguide polymer fibers which are suitable for use in optical plug connectors, the fiber end sleeve being provided with a pressure spring, optimum optical coupling which ensures minimal coupling loss during signal transmission is possible. The free spring travel of the optical waveguides required for the contact pressure of the fiber end sleeves is ensured by appropriately constructed channels in the housing interior of the plug connector. With this arrangement, the optical waveguides follow any longitudinal displacement by the pressure spring, with an appropriate change in their curvature or their position in the widened channel.

An example embodiment of the invention is illustrated in the drawing and explained in more detail below. In the drawing:

FIG. 2 shows a perspective view of two optical plug connectors, not plugged in.

Figure 1:
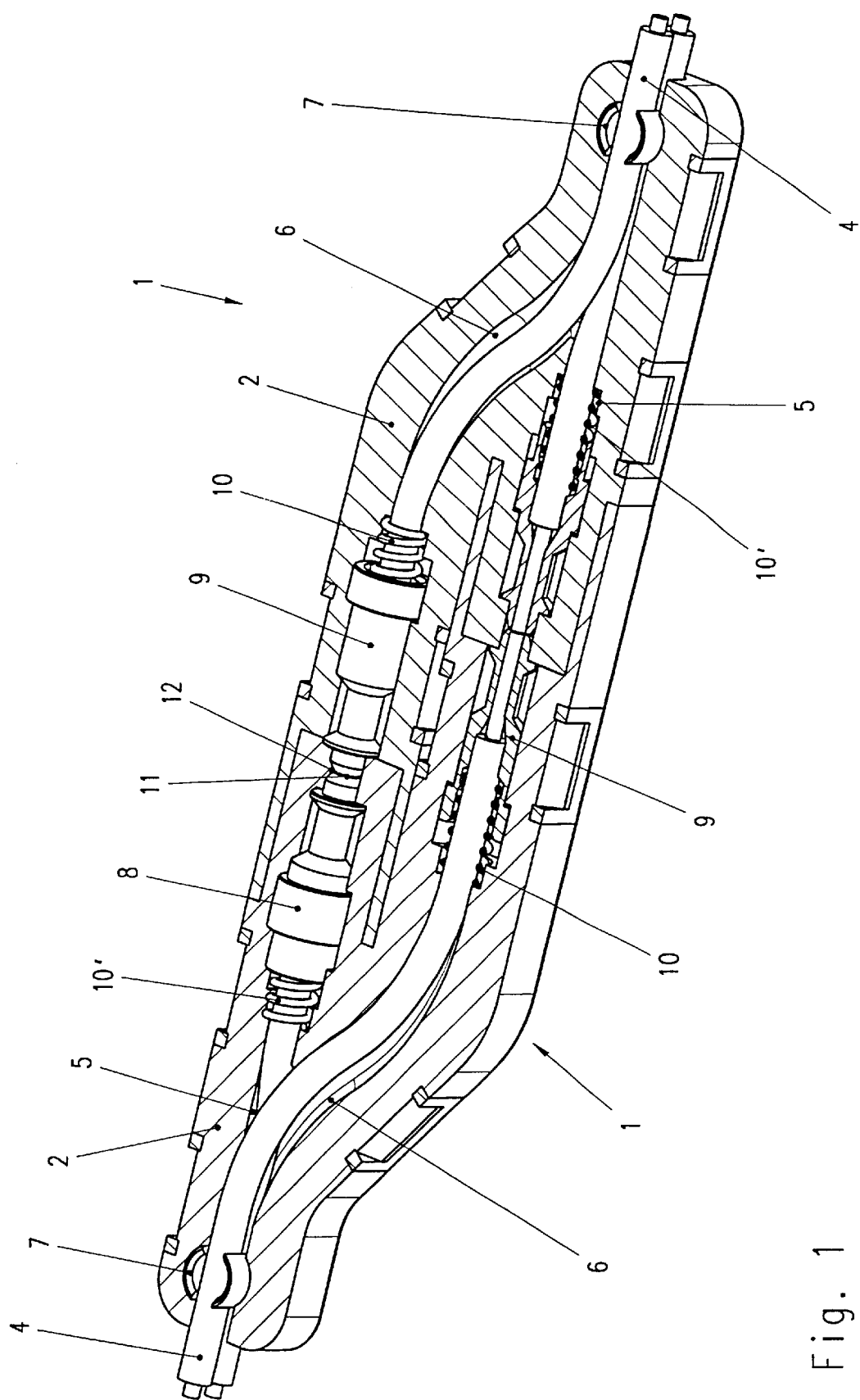
FIG. 1 shows a section through two plugged-in optical plug connectors.

In FIG. 1 two plugged-in optical plug connectors 1 are illustrated in a perspective sectional view.

The housing of the optical plug connector is constructed as a so-called dual-gender housing in which both plug housings 2 are of identical construction as a connector and a counter-connector.

The (in this case for example of two-channel construction) "duplex connector" connects respectively two optical waveguides 4 whereof the fiber ends are fixed in fiber end sleeves 8, 9. In this case, the two optical waveguides 4 to be connected lie with their fiber end sleeves in two separate channels 5, 6 which branch off from a common insertion channel. The branch is of a construction such that t the channel 5 runs in a straight line and the second channel 6, which first bends away, runs in a slightly S-shaped line and then parallel to the first, similar to the points of a railway branch line, the channel 5 running in a straight line being constructed to be shorter than the branching-off channel 6.

At least two of the fiber end sleeves are provided with a pressure spring 10, and these press the end faces 11 of the optical waveguides 4 constantly against one another with a minimum constant t "clearance".

At the same time, in each case two opposing fiber end sleeves are mechanically received and axially guided through the bore 12 in the respective plug housing 2, so that this bore is responsible for precise mechanical guidance in order to achieve optimum optical coupling, The optical waveguides 4 are fixed in a cable tension relief means 7 in the end region or on the insertion side of the plug housings 2. The cable tension relief means is inserted into the respective plug housing as an inset part and comprises for example a tubular slotted sleeve in which the casing of the optical waveguides is clamped in cutting manner.

Two of the optical waveguides are each guided lying on one another, so that both are held at the same time by the cable tension relief means.

In order to ensure the free mobility of the optical waveguides 4 by at least the spring travel of a pressure spring, those optical waveguides whereof the fiber end sleeves 9 are provided with a pressure spring 10 lie in a specially hollowed-out channel 6.

The channel 6 is constructed to be slightly S-shaped, the central region being widened so that the optical waveguide 4—as a result of a change in its curvature and thus its position in the channel—is able to undergo longitudinal displacement with the spring travel of the pressure spring 10.

The pressure springs 10', which are also laid at the opposing fiber end sleeves in this figure, merely represent a constructional variant.

Figure 2:
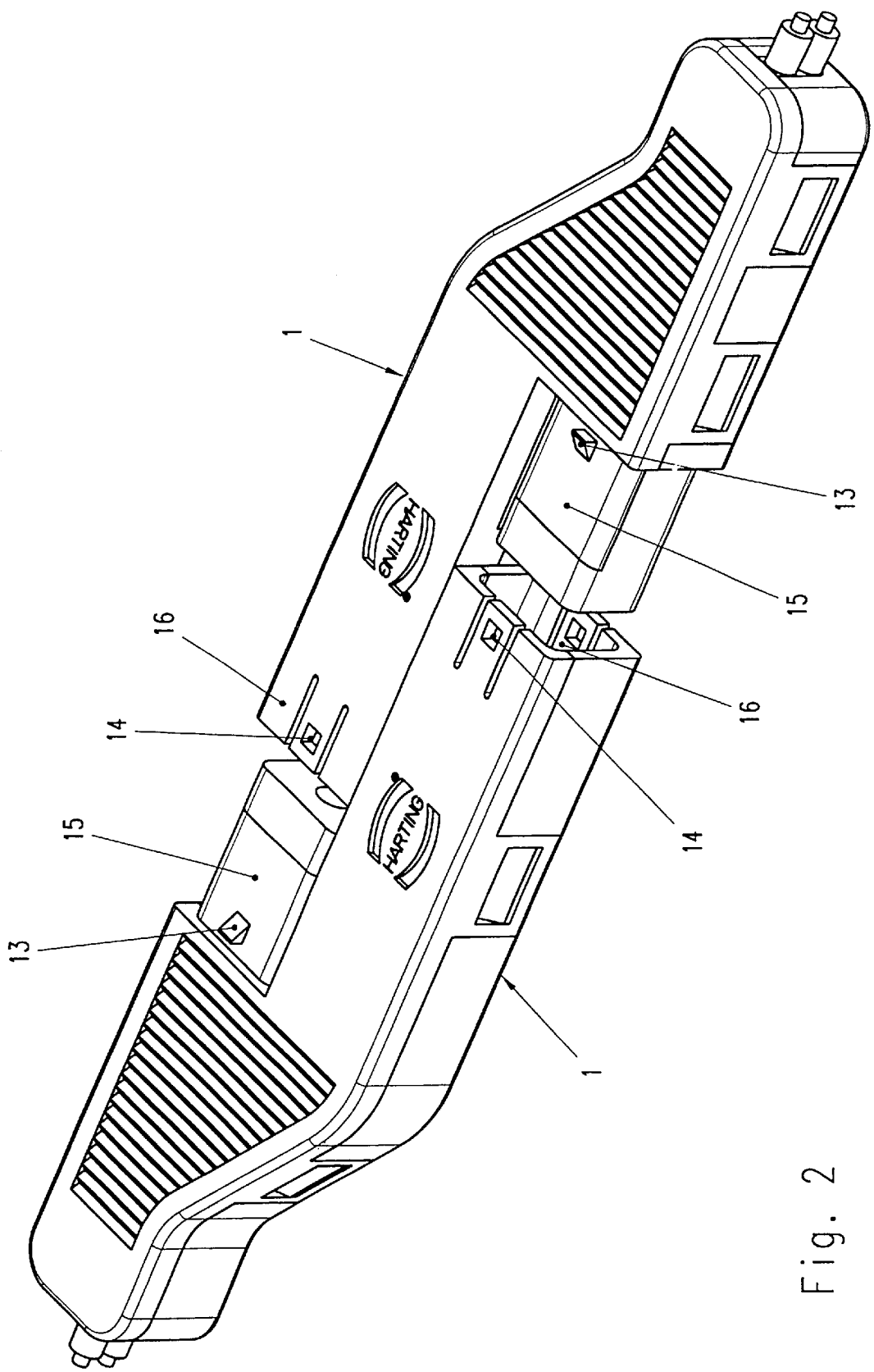

In FIG. 2 two identical optical plug connectors are shown in the unplugged condition, and from this the dual-gender shape of the two housings of the plug connectors 1 can clearly be seen.

The region 15 constructed as the plug is inserted into the respective plugging-in region 16 when the two plug connectors 1 are pushed together, locking of the two plug connectors being performed with the latching means 13, which latch audibly into recesses 14.

Figure 3:
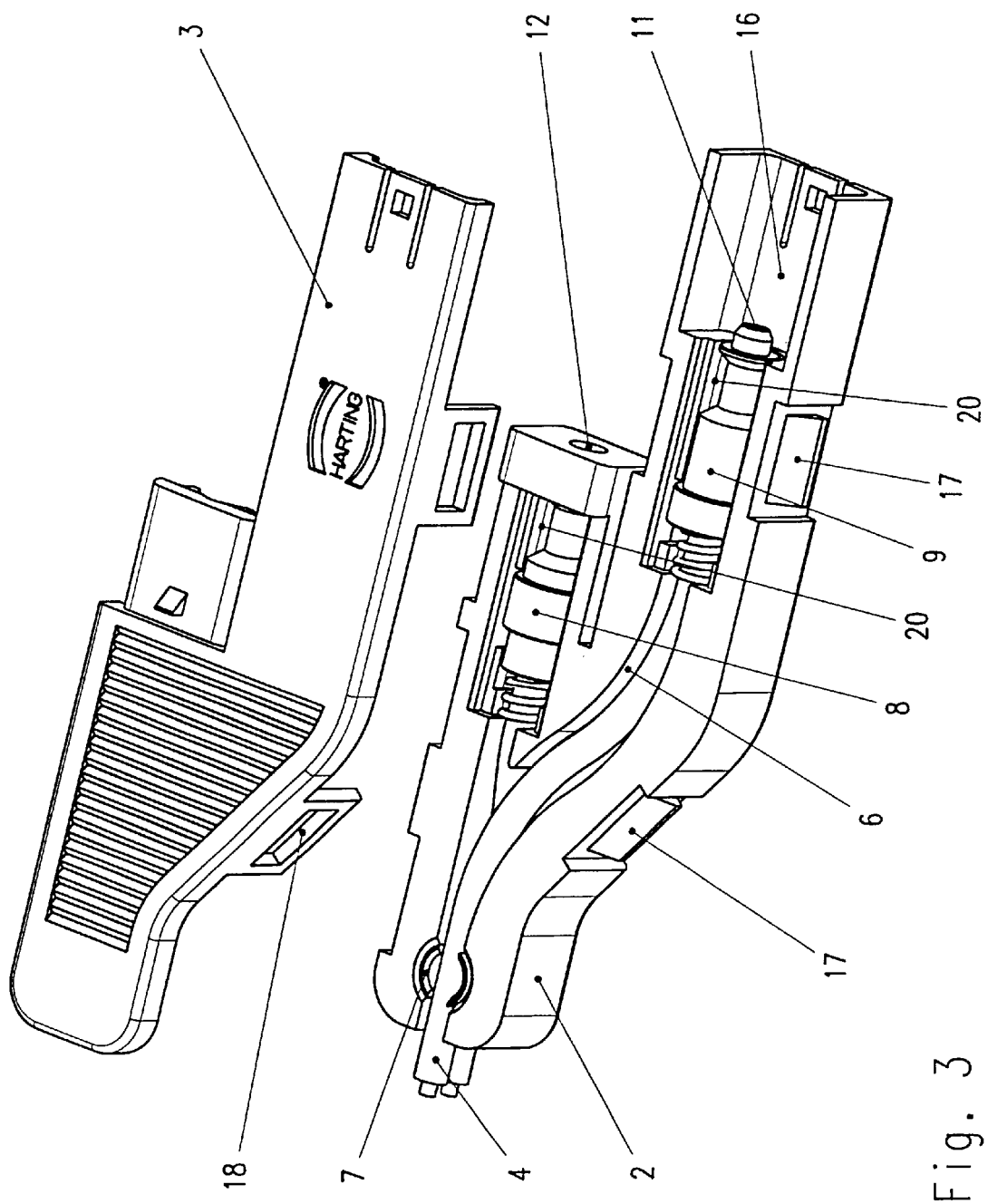
FIG. 3 shows a perspective view of an opened optical plug connector.

FIG. 3 shows an optical plug connector 1 in the opened condition, a cover 3 being illustrated separately above the plug housing 2.

The fiber end sleeves 8, 9 having the crimped-on optical waveguides 4 are laid in the plug housing 2 in appropriately shaped cavities 20. The sunken and thus. protected position of the end faces 11 of the optical waveguides 4 can clearly be seen. Whereas the fiber end sleeve 8 is embedded sunk into the guide bore 12, the fiber end sleeve 9 is sunk into the plugging-in region 16 of collar-shaped construction.

In this arrangement, the fiber end sleeve 8 penetrates by means of its front end and the end face 11 into the bore 12, into which after it is pushed together with the second plug housing the other fiber end sleeve also penetrates by means of its end face, as a result of which precise axial positioning of the two fiber end sleeves is ensured.

The second fiber end sleeve 9 is embedded in the tangentially branching-off part of the plug housing 2, with the collar-shaped plugging-in region 16 projecting in front of the end face in the direction of plugging in, so that adequate protection against contact for the fiber end faces 11 is ensured.

The latching of the plug housing 2 to the cover 3 is carried out by way of the latching elements 17, which are inserted into corresponding recesses 18.

What is claimed is:

1. An optical plug connector for optical waveguides having a plug housing, the plug housing having an insertion side for optical waveguides and a plug side, the plug housing including at least two fiber end sleeves (8, 9) and at least one tension relief element (7) and defining channels (5, 6) and a guide bore (12), and ends of the optical waveguides provided with fiber end sleeves pointing towards the plug side, the tension relief element being disposed within at least one of the channels (5, 6) and adjacent the insertion side, and characterized in that the optical waveguides (4) are held in the region of the insertion side by means of the tension relief element (7), in that the optical waveguides (4) are laid with their fiber end sleeves (8, 9) in the channels (5, 6) made in the plug housing (2), in that the fiber end sleeves (8, 9) are arranged next to one another, offset in the direction of plugging in, in that a pressure spring (10) is provided with at least one of the fiber end sleeves and is disposed within the corresponding channel (5, 6), the fiber end sleeve being held axially resiliently, in that at least that channel (6) in which the optical waveguide (4) whereof the fiber end sleeve (9) is provided with the pressure spring (10) is laid has a widened portion, and in that the front end of the fiber end sleeve (8) lying recessed in the direction of plugging in penetrates into the guide bore (12) and is held therein, wherein the widened portion of the channel (6) extends between the tension relief element (7) and the fiber end sleeve (9) such as to allow displacement of the optical waveguide (4) within the channel.

2. An optical plug connector for optical waveguides having a plug housing, the plug housing having an insertion side for optical waveguides and a plug side, the plug housing including at least two fiber end sleeves (8, 9) and at least one tension relief element (7) and defining channels (5, 6) and a guide bore (12), and ends of the optical waveguides provided with fiber end sleeves pointing towards the plug side, the tension relief element being disposed within at least one of the channels (5, 6) and adjacent the insertion side, and characterized in that the optical waveguides (4) are held in the region of the insertion side by means of the tension relief element (7), in that the optical waveguides (4) are laid with their fiber end sleeves (8, 9) in the channels (5, 6) made in the plug housing (2), in that the fiber end sleeves (8, 9) are arranged next to one another, offset in the direction of plugging in, in that a pressure spring (10) is provided with at least one of the fiber end sleeves and is disposed within the corresponding channel (5, 6), the fiber end sleeve being held axially resiliently, in that at least that channel (6) in which the optical waveguide (4) whereof the fiber end sleeve (9) is provided with the pressure spring (10) is laid has a widened portion, and in that the front end of the fiber end sleeve (8) lying recessed in the direction of plugging in penetrates into the guide bore (12) and is held therein, wherein the widened portion of the channel (6) extends between the tension relief element (7) and the fiber end sleeve (9) such as to allow displacement of the optical waveguide (4) within the channel, wherein at least one channel (6) is curved.

* * * * *